United States Patent
Thompson et al.

(10) Patent No.: US 10,877,636 B2
(45) Date of Patent: Dec. 29, 2020

(54) NON-LINEAR QUALITATIVE VISUALIZATION

(71) Applicant: SCHNEIDER ELECTRIC USA INC., Andover, MA (US)

(72) Inventors: David Charles Thompson, Sidney (CA); Przemyslaw Mroz, Victoria (CA); Mathew Losey, Victoria (CA)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 167 days.

(21) Appl. No.: 15/166,749

(22) Filed: May 27, 2016

(65) Prior Publication Data

US 2016/0349954 A1 Dec. 1, 2016

Related U.S. Application Data

(60) Provisional application No. 62/167,578, filed on May 28, 2015.

(51) Int. Cl.
| | |
|---|---|
| *G06F 3/048* | (2013.01) |
| *G06F 3/0484* | (2013.01) |
| *G01D 4/00* | (2006.01) |
| *G05F 1/66* | (2006.01) |
| *G06F 3/0481* | (2013.01) |

(Continued)

(52) U.S. Cl.
CPC ............ *G06F 3/0484* (2013.01); *G01D 4/00* (2013.01); *G05F 1/66* (2013.01); *G06F 3/04812* (2013.01); *G06T 11/001* (2013.01); *G06T 11/206* (2013.01); *G06T 2200/24* (2013.01)

(58) Field of Classification Search
CPC ...... G06F 3/0484; G06F 1/66; G06F 3/04812; G01D 4/00; G06T 11/001; G06T 11/206; G06T 2200/24
See application file for complete search history.

(56) References Cited

U.S. PATENT DOCUMENTS

| | | | |
|---|---|---|---|
| 2005/0065742 A1 | 3/2005 | Rodgers | |
| 2007/0060798 A1* | 3/2007 | Krupnik ............ | A61B 1/00045 600/300 |
| 2010/0070217 A1 | 3/2010 | Shimada et al. | |

(Continued)

FOREIGN PATENT DOCUMENTS

WO 9923455 A1 5/1999

OTHER PUBLICATIONS

Extended European Search Report from corresponding European Application No. 16171837.4 dated Oct. 20, 2016.

*Primary Examiner* — Anil N Kumar
(74) *Attorney, Agent, or Firm* — Lando & Anastasi, LLP

(57) ABSTRACT

A system includes an item of electrical equipment, a power meter configured to monitor a parameter of power delivered to and/or supplied by the item of electrical equipment, a processor configured to receive an indication of the monitored parameter and determine a rating from at least the indication of the monitored parameter, and a graphical user interface (GUI) configured to display the rating in a visualization including an object divided into a plurality of graphical category sub-sections. Each of the plurality of graphical categories represents a range of ratings, At least one of the plurality of graphical categories represents a greater range of ratings than at least one other of the plurality of graphical categories.

22 Claims, 11 Drawing Sheets

(51) Int. Cl.
*G06T 11/00* (2006.01)
*G06T 11/20* (2006.01)

(56) References Cited

U.S. PATENT DOCUMENTS

| | | | | |
|---|---|---|---|---|
| 2011/0251807 A1* | 10/2011 | Rada | ........................ | G01D 4/00 |
| | | | | 702/61 |
| 2012/0173034 A1* | 7/2012 | Taima | ........................ | B60L 3/12 |
| | | | | 700/295 |
| 2018/0212427 A1* | 7/2018 | Niikura | .................. | G06Q 50/06 |

* cited by examiner

ISO 14644-1 Cleanroom Standards

| Class | maximum particles/m³ | | | | | | Fed STD 209E equivalent |
|---|---|---|---|---|---|---|---|
| | ≥0.1 μm | ≥0.2 μm | ≥0.3 μm | ≥0.5 μm | ≥1 μm | ≥5 μm | |
| ISO 1 | 10 | 2.37 | 1.02 | 0.35 | 0.083 | 0.0029 | |
| ISO 2 | 100 | 23.7 | 10.2 | 3.5 | 0.83 | 0.029 | |
| ISO 3 | 1,000 | 237 | 102 | 35 | 8.3 | 0.29 | Class 1 |
| ISO 4 | 10,000 | 2,370 | 1,020 | 352 | 83 | 2.9 | Class 10 |
| ISO 5 | 100,000 | 23,700 | 10,200 | 3,520 | 832 | 29 | Class 100 |
| ISO 6 | 1.0x10⁶ | 237,000 | 102,000 | 35,200 | 8,320 | 293 | Class 1,000 |
| ISO 7 | 1.0x10⁷ | 2.37x10⁶ | 1,020,000 | 352,000 | 83,200 | 2,930 | Class 10,000 |
| ISO 8 | 1.0x10⁸ | 2.37x10⁷ | 1.02x10⁷ | 3,520,000 | 832,000 | 29,300 | Class 100,000 |
| ISO 9 | 1.0x10⁹ | 2.37x10⁸ | 1.02x10⁸ | 35,200,000 | 8,320,000 | 293,000 | Room Air |

*FIG. 7B*

NON-LINEAR QUALITATIVE VISUALIZATION

CROSS-REFERENCE TO RELATED APPLICATION

This application claims priority under 35 U.S.C. § 119(e) to U.S. Provisional Application Ser. No. 62/167,578 titled "NON-LINEAR QUALITATIVE VISUALIZATION," filed May 28, 2015, which is incorporated herein by reference in its entirety for all purposes.

BACKGROUND

Energy management and power quality standards (such as IEEE 1159 and the ITIC Curve) often map a range of measurement values into multiple categories. While this simplifies assessment, it can obscure the movement of measurement values within a category over time, masking a pending transition from a "better" category towards a "worse" category.

SUMMARY

In accordance with an aspect of the present disclosure, there is provided a system comprising an item of electrical equipment, a power meter configured to monitor a parameter of power delivered to and/or supplied by the item of electrical equipment, a processor configured to receive an indication of the monitored parameter and determine a rating from at least the indication of the monitored parameter, and a graphical user interface (GUI) configured to display the rating in a visualization including an object divided into a plurality of graphical category sub-sections. Each of the plurality of graphical category sub-sections represents a range of ratings. At least one of the plurality of graphical category sub-sections represents a greater range of ratings than at least one other of the plurality of graphical category sub-sections.

In some embodiments, the GUI is configured to display each of the graphical category sub-sections with a substantially similar size.

In some embodiments, the processor is configured to receive the indication of the monitored parameter and determine a Power Quality rating from at least the indication of the monitored parameter and the GUI is configured to display the Power Quality rating in the visualization, each of the plurality of graphical category sub-sections representing a range of Power Quality Ratings, at least one of the plurality of graphical category sub-sections representing a greater range of Power Quality Ratings than at least one other of the plurality of graphical category sub-sections.

In some embodiments, the GUI further includes an indication of a target range of Power Quality Ratings.

In some embodiments, the GUI is configured to graphically indicate the graphical category sub-section representing the range of Power Quality Ratings including the Power Quality Rating in an enhanced manner relative to the other graphical category sub-sections.

In some embodiments, the GUI is configured to display factors contributing to the Power Quality Rating.

In some embodiments, the GUI is further configured to display a warning responsive to the Power Quality Rating being outside of a desired range.

In some embodiments, the GUI is included in a Power Quality Meter.

In some embodiments, the Power Quality Meter further includes the power meter and processor.

In some embodiments, the GUI is included in a control system for the item of electrical equipment.

In some embodiments, the control system is configured to automatically perform an action affecting the item of electrical equipment responsive to the Power Quality Rating being outside of a desired range.

In accordance with another aspect of the present disclosure, there is provided a method comprising monitoring a parameter of power delivered to and/or supplied by an item of electrical equipment with a power meter, receiving an indication of the monitored parameter and determining a rating from at least the indication of the monitored parameter using a processor of the power meter, and displaying the rating in a graphical user interface (GUI) in a visualization including an object divided into a plurality of graphical category sub-sections. Each of the plurality of graphical category sub-sections represents a range of ratings. At least one of the plurality of graphical category sub-sections represents a greater range of ratings than at least one other of the plurality of graphical category sub-sections.

In some embodiments, the method further comprises automatically initiating, by the processor, measures to help alleviate a Power Quality issue of the item of electrical equipment responsive to a Power Quality Rating of the item of electrical equipment falling into an unacceptable range.

In some embodiments, the method further comprises defining the range of ratings in each of the plurality of graphical category sub-sections in accordance with a non-linear and non-logarithmic transfer function.

In some embodiments, the method further comprises displaying each of the graphical category sub-sections with a substantially similar size.

In accordance with another aspect of the present disclosure, there is provided a power meter comprising a measurement system configured to measure as aspect of power quality of an item of electrical equipment, a processor configured to receive an indication of a measurement of the aspect of power quality from the measurement system and to determine a rating from at least the measurement of the aspect of power quality, and a graphical user interface (GUI) configured to display the rating in a visualization including an object divided into a plurality of graphical category sub-sections. Each of the plurality of graphical category sub-sections represents a range of ratings. At least one of the plurality of graphical category sub-sections represents a greater range of ratings than at least one other of the plurality of graphical category sub-sections.

In some embodiments, the processor is further configured to automatically initiate measures to help alleviate a Power Quality issue of the item of electrical equipment responsive to a Power Quality Rating of the item of electrical equipment falling into an unacceptable range.

In some embodiments, the GUI displays at least a portion of the plurality of graphical category sub-sections in a different color than a least a second portion of the plurality of graphical category sub-sections.

In some embodiments, the GUI displays measurements of the aspect of power quality in a trend chart.

In some embodiments, the GUI displays a range of the aspect of power quality observed in sites other than a site including the item of electrical equipment.

BRIEF DESCRIPTION OF DRAWINGS

The accompanying drawings are not intended to be drawn to scale. For purposes of clarity, not every component may be labeled in every drawing. In the drawings:

FIG. 7B illustrates an ISO 14644-1 cleanroom standards data table;

DETAILED DESCRIPTION

Figure 1:
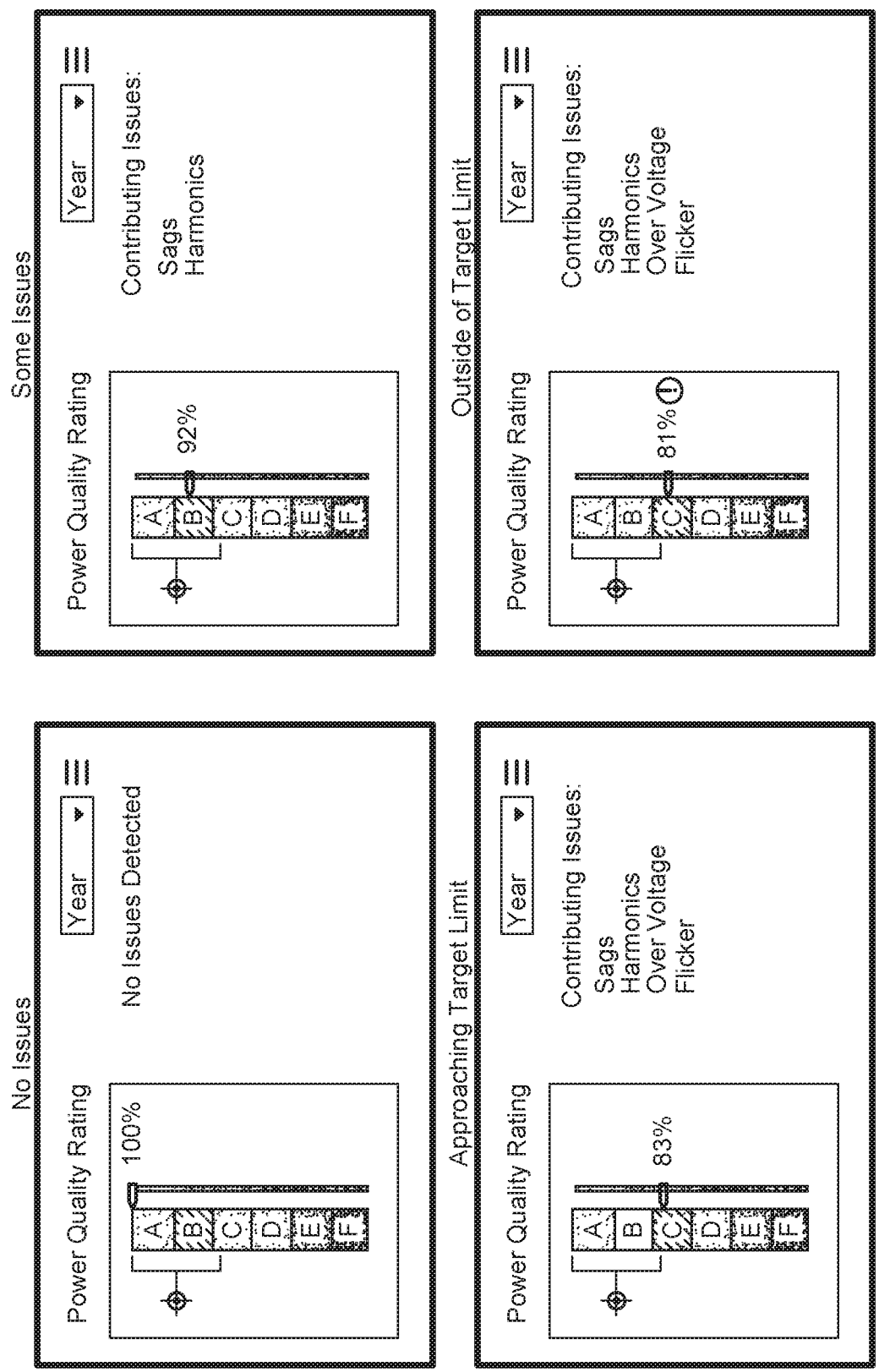
FIG. 1 illustrates an example of a visualization of data regarding Power Quality.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

In accordance with some aspects and embodiments disclosed herein, a visualization displays measurement values within the context of predefined categories and a target range of acceptable values. The categories are displayed as an object (such as a rectangle) divided equally into multiple regions, with each region representing one category. A range of measurement values is mapped to each category, and a marker adjacent to or within the categories object represents the current value of the measurement. A target range indicator adjacent to the categories object indicates the acceptable range of measurement values. Once mapped to the categories object, the range of measurement values is non-linear, and in some embodiments, non-logarithmic; if the entire range of values is 1 to 100, for example, one region may represent values 95 to 100 and another region may represent values 0 to 55. This nonlinear or non-logarithmic mapping approach provides greater sensitivity to value changes in regions of interest.

FIG. 1 provides an example of this approach for a Power Quality (PQ) scale that ranges from 100% (great power quality) to 0% (poor power quality). Six PQ Rating categories are defined as follows:
  A: 95-100%
  B: 85-94.9%
  C: 75-84.9%
  D: 65-74.9%
  E: 55-64.9%
  F: 0-54.9%

FIG. 1 shows PQ Rating values moving from 100% towards 81% (outside the target range) in a panel of four images. In this example, the PQ scale is an aggregate summary of several power quality measures (for example, voltage sags, voltage and current harmonics, overvoltage events, and flicker). In other embodiments the PQ rating may be based on one or more other parameters. As power quality declines, the visualization also indicates which PQ measures are contributing to the lower PQ scale values. An exclamation mark or other indicator is placed next to the marker once the PQ Rating value drops outside of the target range. Inactive regions (not adjacent to the marker) are given a neutral color and the active region (adjacent to the marker) is given an active color. Different active colors may be used by each region to differentiate desirable from non-desirable regions. The sample visualizations in FIG. 1 also contain an optional color gradient next to the categories object. This color gradient provides a visual cue as to the preferential ranking of the regions, for example, being red adjacent undesirable regions and green adjacent desirable regions.

Figure 2:
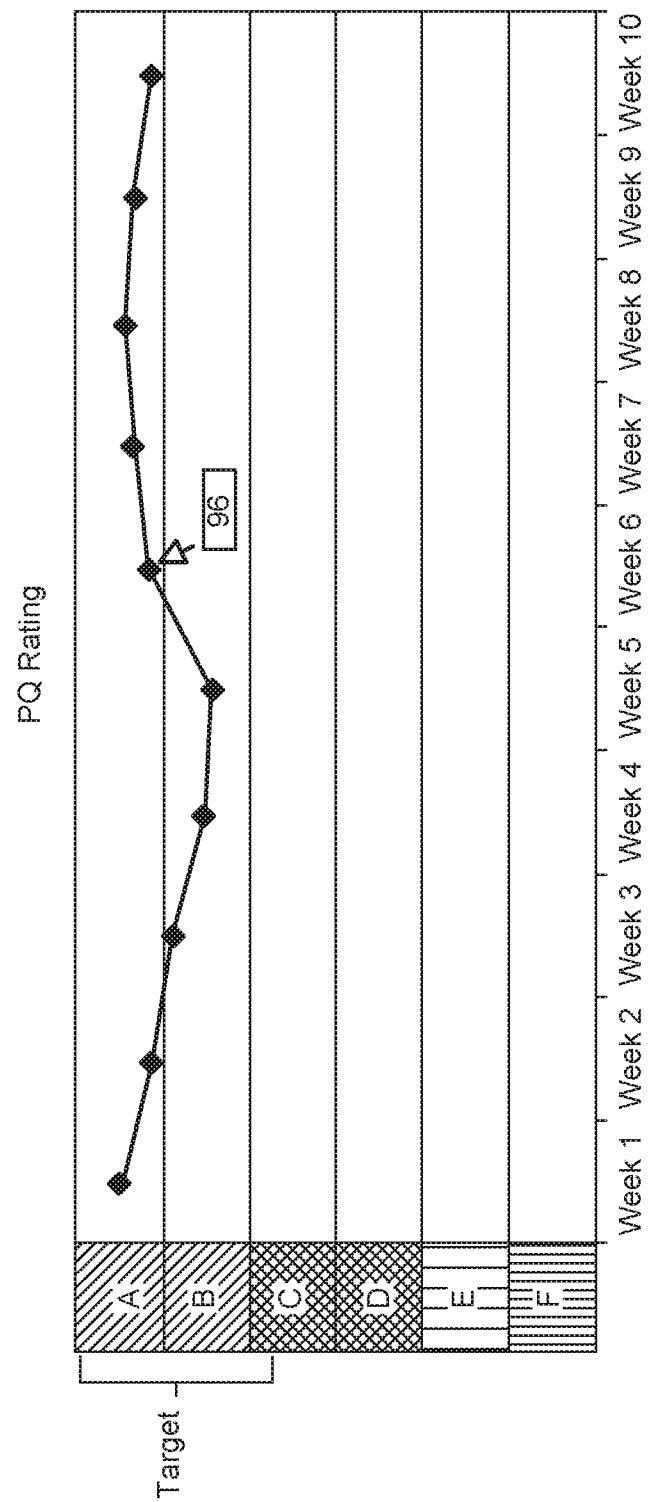
FIG. 2 illustrates another example of a visualization of data regarding Power Quality.

FIG. 2 shows how the visualization described above can be extended to a trend chart. The categories object on the y-axis of the chart indicates the different category ranges, and the boundaries between regions are extended horizontally across the body of the chart. The target range is adjacent to the categories object, with the lower end of the target range extended across the chart body (and made visually distinct from the extended category boundary lines). The example chart in FIG. 2 is a time series chart with PQ Rating values captured once per week. Hovering the mouse pointer near a specific point on the chart will expose a tooltip containing the PQ Rating value of that point. As with the visualization described above, this non-linear value mapping approach provides greater sensitivity to value changes in regions of interest.

Figure 3A:
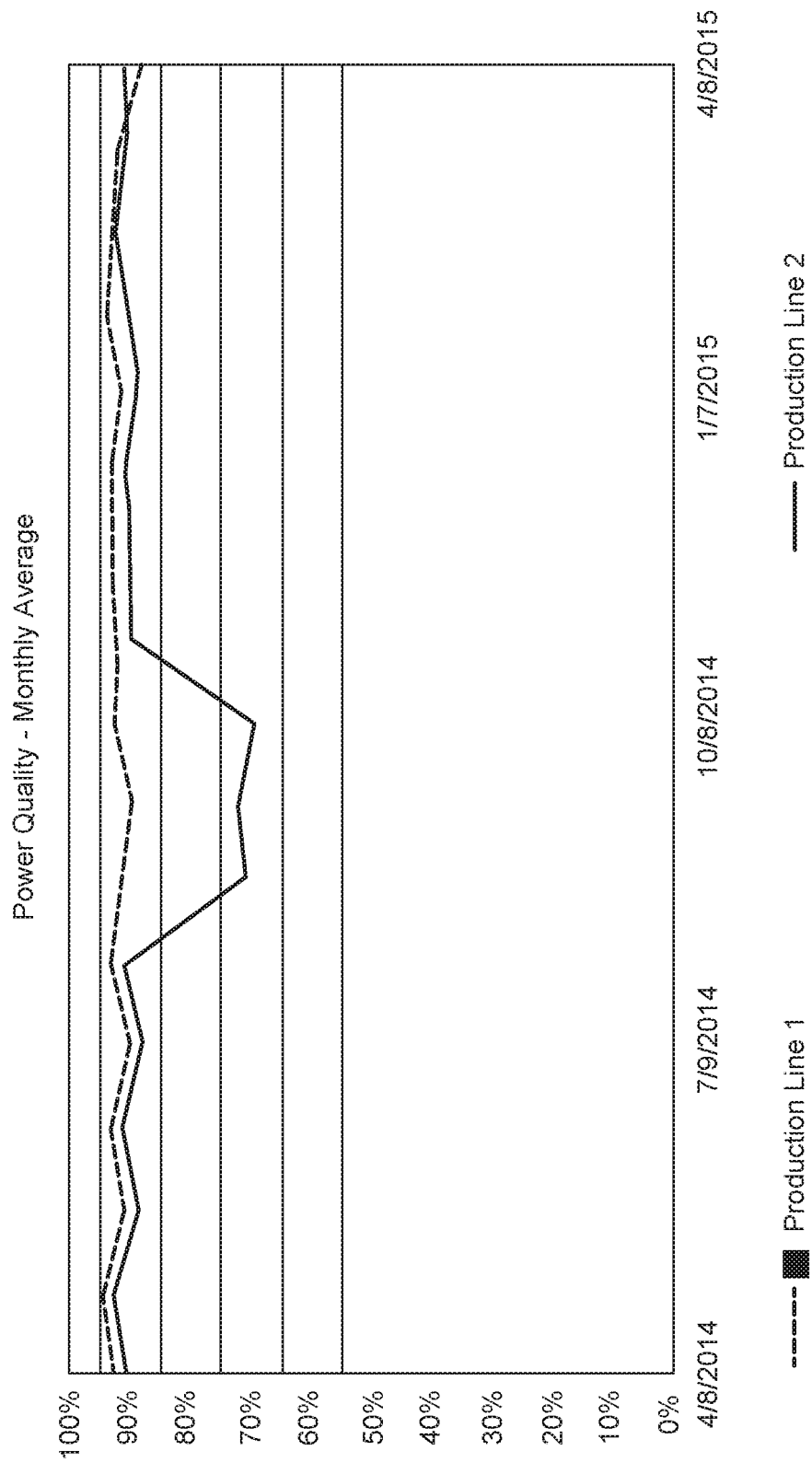
FIG. 3A illustrates another example of a visualization of data regarding Power Quality.
Figure 3B:
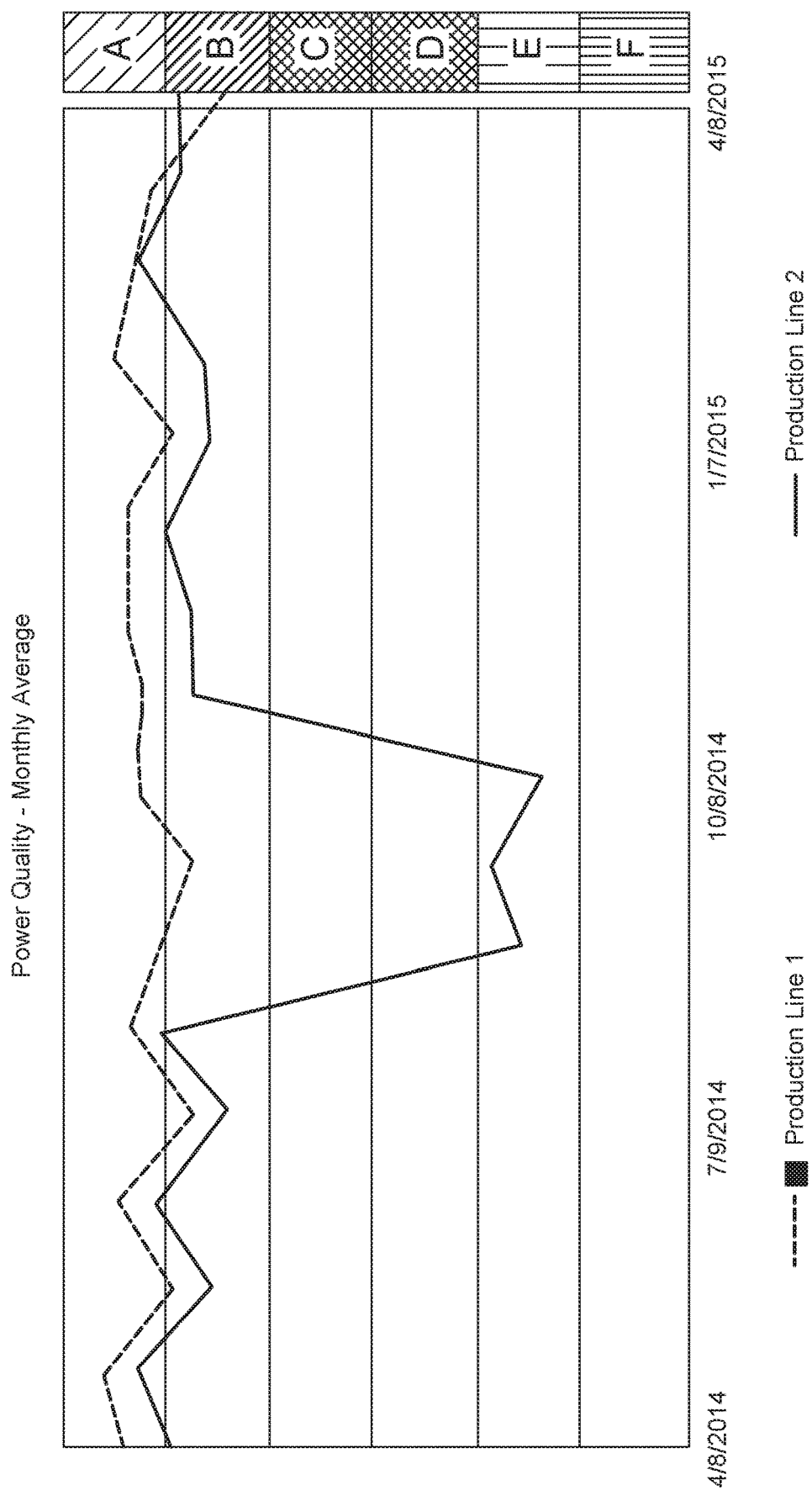
FIG. 3B illustrates another example of a visualization of data regarding Power Quality.

FIGS. 3A and 3B illustrate an additional embodiment of the visualization. FIG. 3A illustrates a trend chart of Power Quality Ratings over time with a linearly scaled vertical axis. Small changes in the Power Quality Ratings may be difficult to discern in this linearly scaled trend chart and the trend chart includes a large amount of unused space. By comparison, FIG. 3B illustrates the data from the trend chart of FIG. 3A after the vertical axis of the chart has been modified to include non-linearly scaled regions A-F. The regions A-F in FIG. 3B correspond to the following Power Quality Rating ranges:
  A: 95-100%
  B: 85-94.9%
  C: 75-84.9%
  D: 65-74.9%
  E: 55-64.9%
  F: 0-54.9%

As in the example illustrated in FIG. 1, different colors may be used by each region to differentiate desirable from non-desirable regions. Inactive regions (in which the most current PQ Rating is not included) may be given a neutral color and the active region (in which the most current PQ Rating is included) may be given an active color. Again, with the visualization illustrated in FIG. 3B, this non-linear value mapping approach provides greater sensitivity to value changes in regions of interest than the linear mapping illustrated in FIG. 3A.

Figure 4:
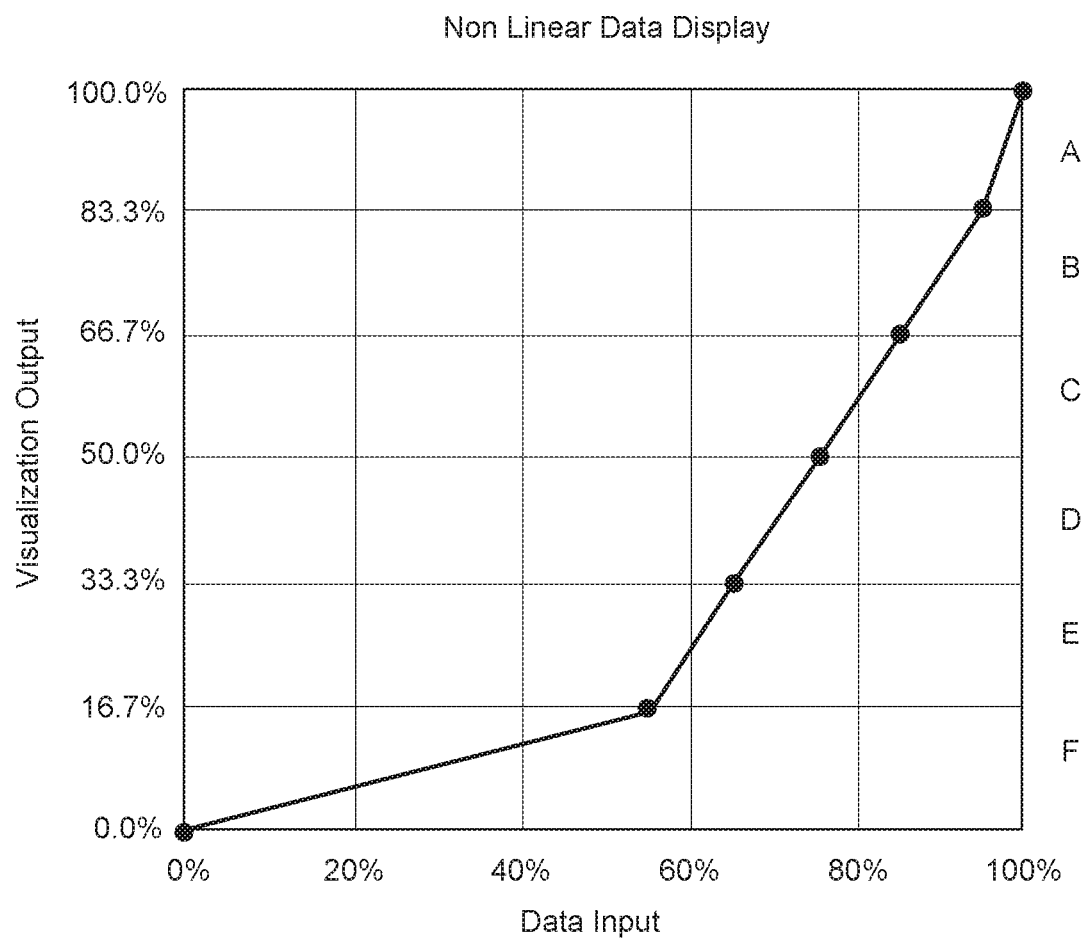
FIG. 4 is an example of a non-linear transfer function.

FIG. 4 is an example of an alternative non-linear, (piecewise linear) transfer function for a PQ Rating visualization as illustrated in any of FIGS. 1-3B above. Data from a 0-100% range is mapped to 6 equally sized categories. The data range for each category is not equal (A=5% range, F=55% range). This transfer function would define how the PQ Rating indicator is positioned on the visualization. In some embodiments, the transfer function is both non-linear and non-logarithmic and the data range for each category is different from that which would be obtained from a linear or logarithmic transfer function.

Figure 5A:
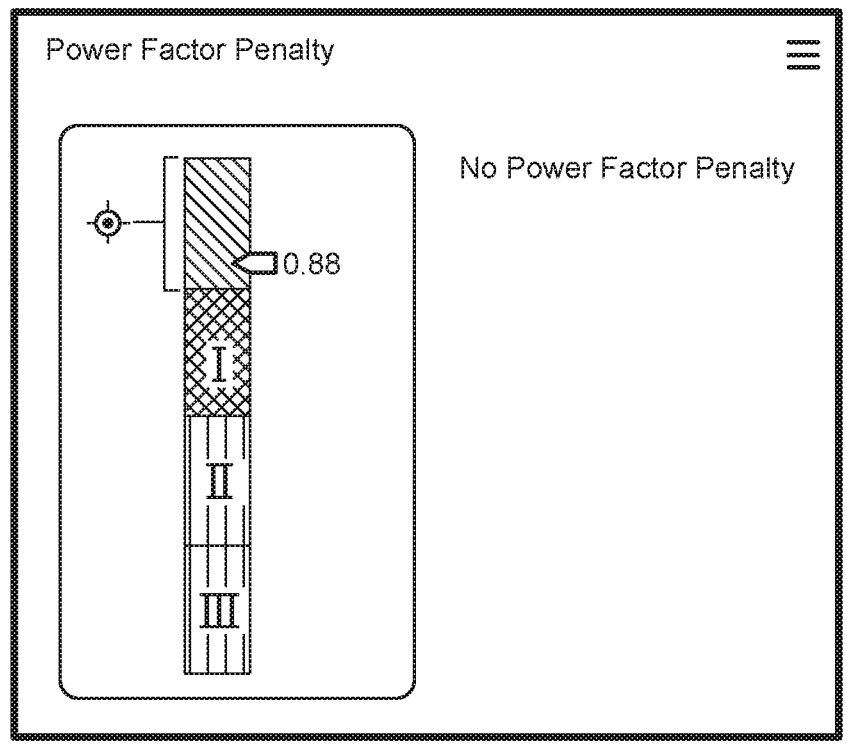
FIG. 5A illustrates an example of visualization of data regarding Power Factor.
Figure 5B:
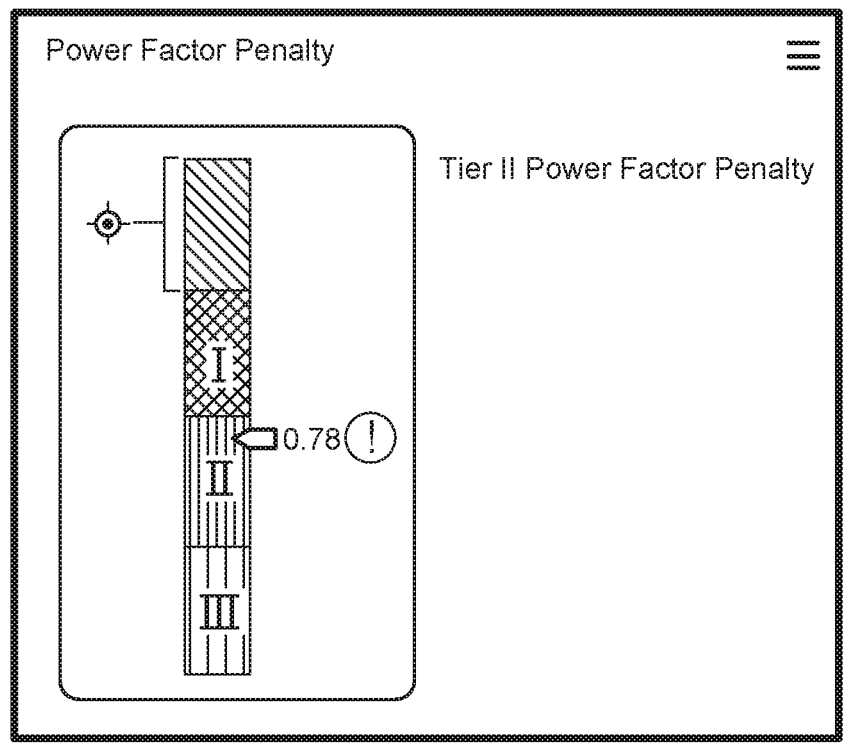
FIG. 5B illustrates another example of a visualization of data regarding Power Factor.

In other embodiments, the categories and associated ratings may be indicative of parameters other than Power Quality. For example, those skilled in the art would recognize that a facility that exhibits a poor Power Factor may be assessed a penalty by a utility providing power to the facility. It thus may be desirable to provide an easy to read and interpret display of Power Factor for a facility or for one or more particular loads in a facility in a visualization similar to that illustrated in FIG. 1 and in the other examples disclosed herein. For example, as illustrated in FIG. 5A, a visualization regarding Power Factor for a facility shows that the facility is operating in a range of Power Factor values that is within a desired range, indicated by the bracket about the top section of the indicator bar. The visualization of FIG. 5A also may indicate via text whether the facility is operating in a range of Power Factor that will not incur a penalty from an associated utility, or alternatively if the facility is operating in a range of Power Factor that will incur a penalty and if so, what level of penalty (FIG. 5B). With the visualizations of FIGS. 5A and 5B, an operator of the facility could determine when the Power Factor of the facility or load(s) within the facility was approaching a level that might result in the facility being penalized by the utility and the operator could take action to address the poor Power Factor.

Figure 6:
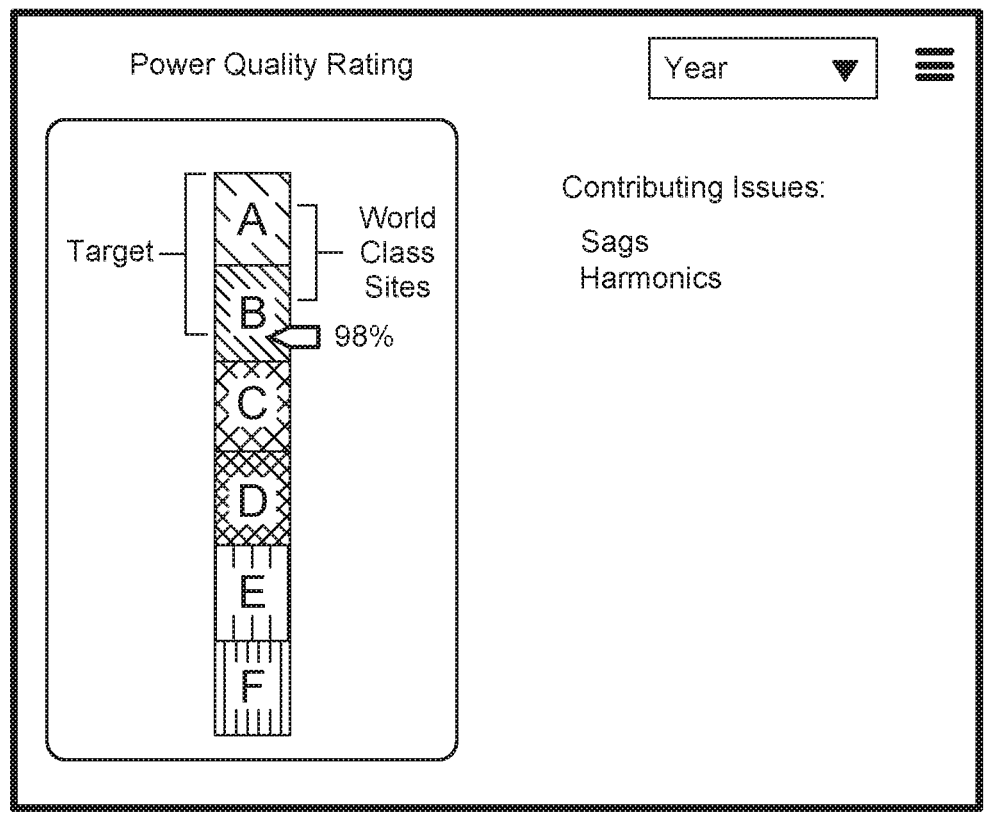
FIG. 6 illustrates another example of a visualization of data regarding Power Quality.

In some embodiments, in addition to or as an alternative to setting the PQ rating categories with fixed ranges, the displayed PQ rating categories, additional PQ rating categories, or an additional indicator similar to the target range indicator illustrated in the example of FIG. 1 may provide information regarding the PQ rating performance of a facility as compared with other similar types of facilities. The additional or alternative rating categories or indicators could indicate a percentile ranking of the performance of the facility with regard to other facilities. In one example, an additional range indicator for a visualization of a PQ rating of a facility could be provided in the visualization to show the range of PQ ratings exhibited by facilities in the best (or worst) 10%, 15%, 50%, or other desired percentage of other facilities. For example, as illustrated in FIG. 6, a visualization for PQ of a facility includes an indicator of a range of PQ Ratings for other facilities considered to be "world class" in addition to an indicator of a target range, a current exhibited PQ rating, factors contributing to the PQ Rating, and different regions representing categories or ranges of PQ ratings. Statistical data, real-time or historical, from worldwide sites might show that the top 10%, 15%, or other percent or number of facilities have a PQ Rating ranging between 98% and 91% and are deemed "world class." This data can be shown on the visualization to help the facility see how they compare to "world class" sites. The data being mapped may be either static (manually entered), or based on data reporting (live and automatic).

Figure 7A:
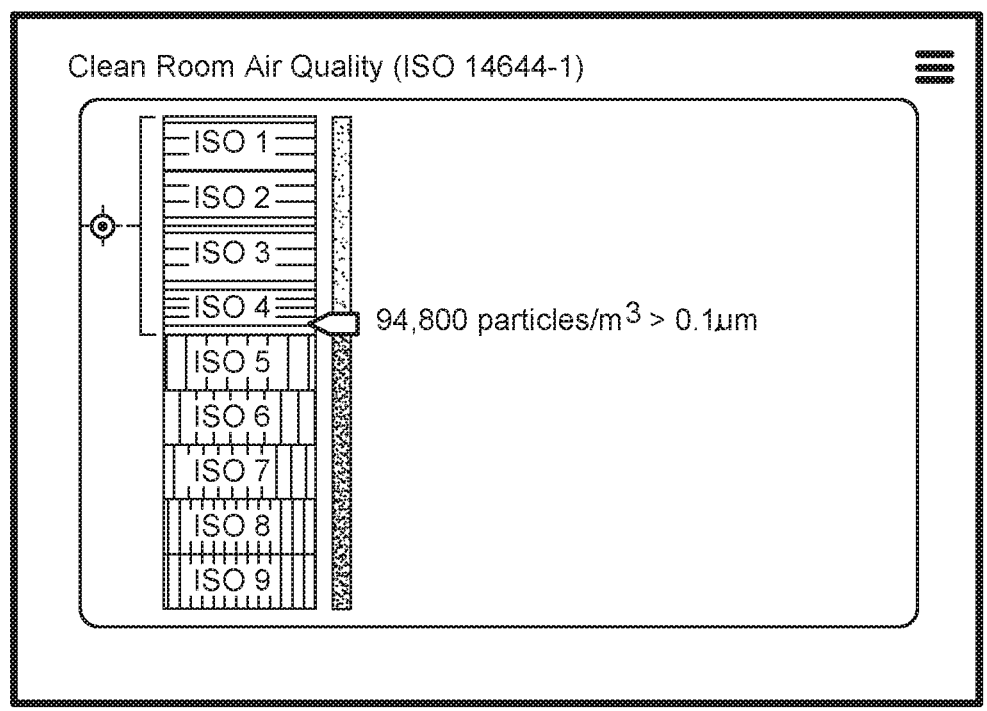
FIG. 7A illustrates an example of a visualization of data regarding cleanroom air quality.

FIG. 7A shows an example of another set of non-linear categories, ISO 14644-1, clean room standards. Air quality is mapped to one of nine ratings. The data covers ~eight orders of magnitude of airborne particle counts—a huge range—which would be difficult to visualize on a linear scale. The non-linear visualization of FIG. 7A helps an operator know how "good" or "bad" of an ISO rating they have, and serves well for plotting trends versus time, detecting anomalies, etc. The equally sized categories make the visualization simple to understand and provides an easier way to determine an ISO rating than comparing particle count numbers against an ISO 14644-1 table (FIG. 7B) which is what is traditionally done. In this example, the site is an ISO 4 cleanroom, which is their minimum target, but is dangerously close to being classified as an ISO 5 cleanroom, which might be unacceptable for their customers who use their cleanroom facilities for manufacture on the basis it is an ISO 4 cleanroom.

Figure 8:
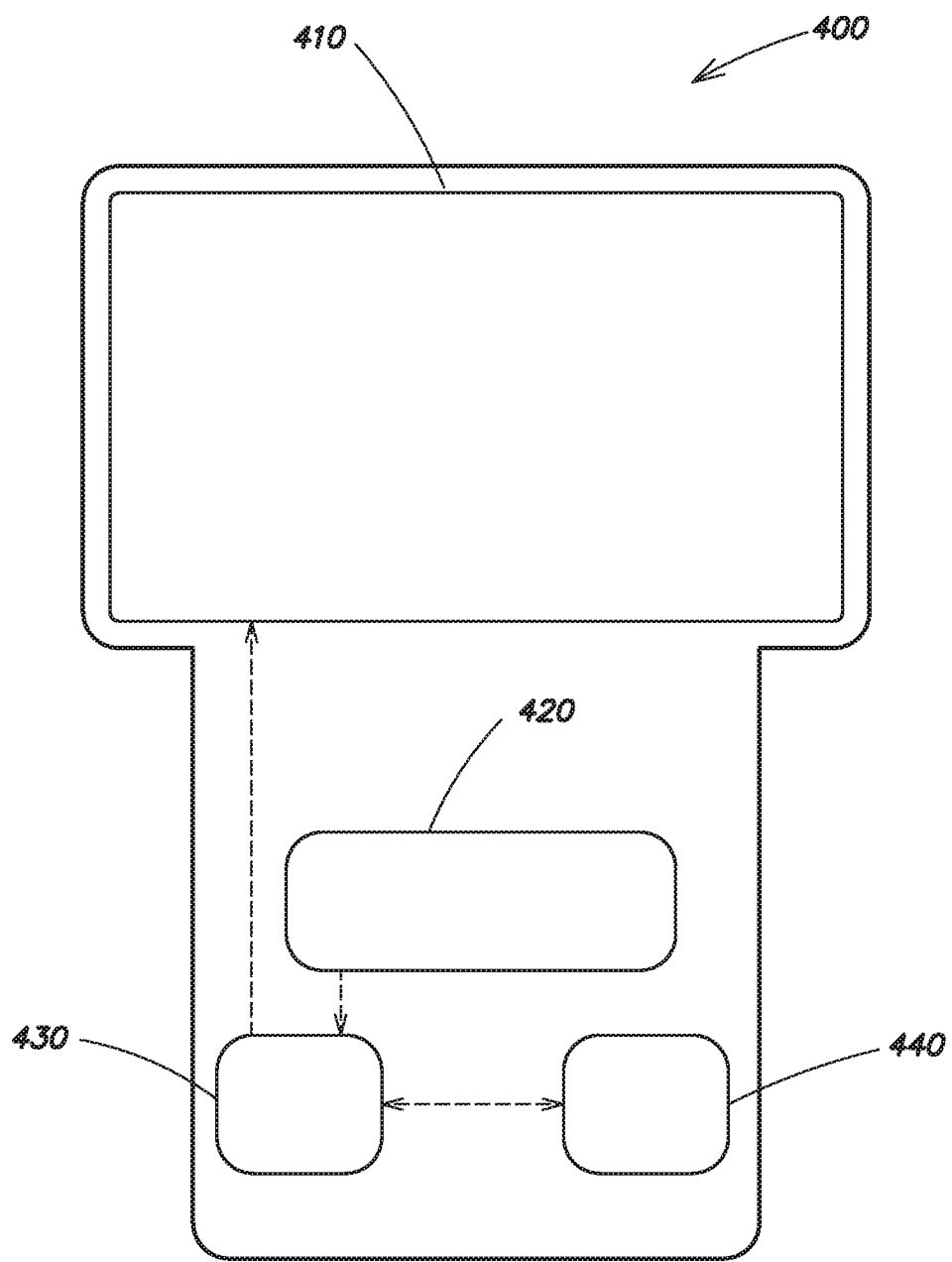
FIG. 8 illustrates an example of a power quality meter.

Aspects and embodiments disclosed herein encompass systems in which embodiments of the disclosed visualizations may be displayed. In one example, illustrated schematically in FIG. 8, a Power Quality meter 400 may include a graphical user interface (GUI) 410 in which embodiments of the visualizations disclosed herein may be presented to a user. The Power Quality meter 400 may include one or more measurement systems 420 including, for example, voltage and/or current meters capable of monitoring or measuring an aspect of Power Quality at a facility and/or of an item of electrical or electronic equipment at a facility. A processor 430 including, for example, a general purpose processor or application specific integrated circuit (ASIC) may process information from the one or more measurement systems 420 and store data regarding one or more measured parameters in a memory 440 of the Power Quality meter 400. The processor 430 may further be programmed or otherwise configured to display the data regarding the one or more measured parameters and/or a composite Power Quality rating derived from the one or more measured parameters in the GUI 410 in a manner consistent with one or more of the visualizations disclosed herein. The Power Quality meter 400 may be a portable device that a user may carry to different areas in a facility. In alternate embodiments, the Power Quality meter 400 may be configured to monitor and/or measure and display information regarding different metrics, for example, Power Factor, cleanroom air quality, environmental parameters such as temperature or humidity, or other parameters of a facility or equipment in a facility and thus may be referred to as a Power Factor meter, an Air Quality meter, or another type of meter depending on what parameters or metrics it is configured to measure, monitor, and/or display.

Figure 9:
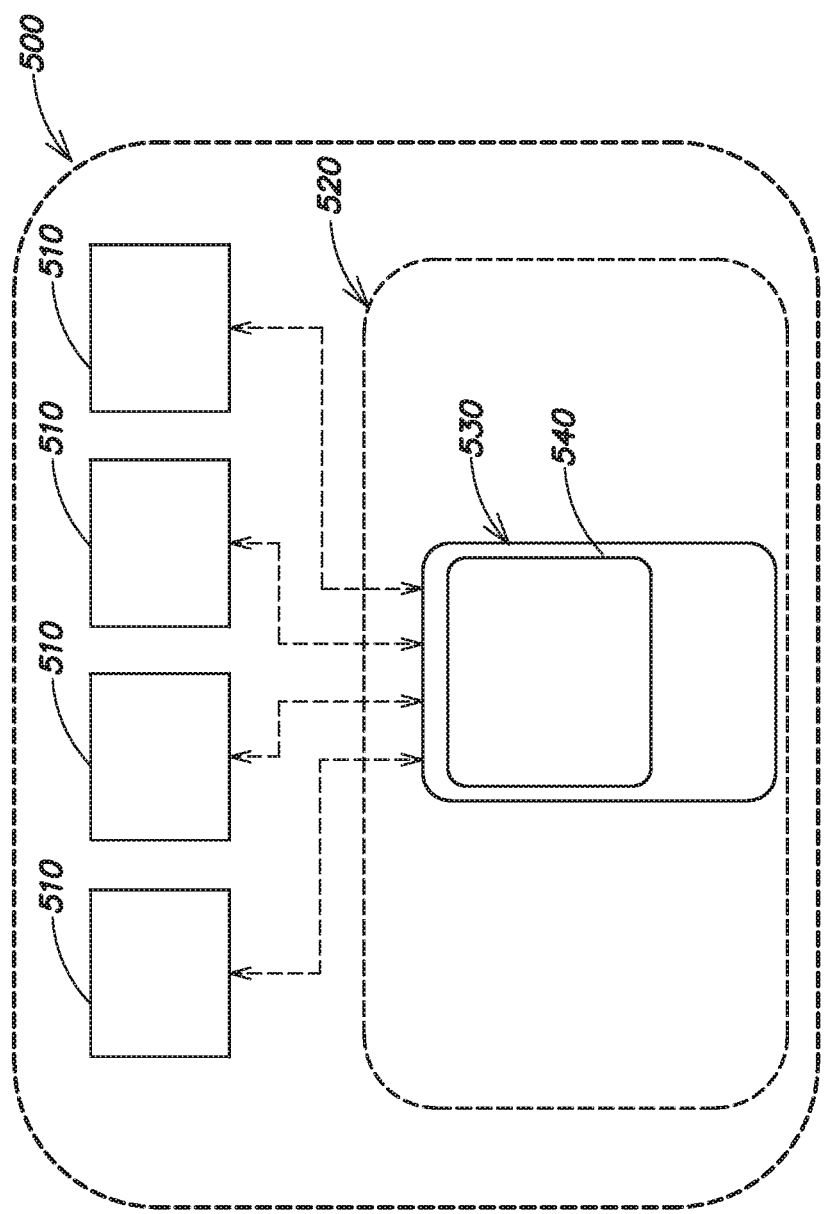
FIG. 9 schematically illustrates an example of a facility in which aspects disclosed herein may be disposed or performed.

In another embodiment, aspects and embodiments of the visualizations disclosed herein may be utilized in a part of a control system for a facility. For example, as illustrated in FIG. 9, a facility 500 may include multiple pieces of equipment 510, for example, power supplies, cooling systems, electronic systems such as computer servers, etc. A centralized monitoring and control system 520 may receive signals indicative of the Power Quality, for example, Power Factor, voltage and/or current levels and/or indications of continuity of power or harmonics of power supplied by or to the various pieces of equipment 510 and/or other metrics as disclosed herein. The centralized monitoring and control system 520 may include at least one electronic device 530, for example, a computer, including a GUI 540 in which embodiments of the visualizations disclosed herein are presented to provide an indication of a Power Quality Rating for power supplied by or to the various pieces of equipment 510.

In some embodiments, if the Power Quality Rating of one or more of the various pieces of equipment 510 falls into a range outside of a desired target range, for example, below the target range illustrated by the bracketed region in the embodiment of the visualization illustrated in FIG. 1, the electronic device 530, or the processor 430 of the Power Quality meter 400, may cause a first action to be taken. This first action may be, for example, to provide a visual and/or audio warning or some other form of warning message, textual or otherwise, to an operator of the centralized monitoring and control system 520. In some embodiments, if the Power Quality issue is not resolved and the Power Quality Rating of the one or more of the various pieces of equipment 510 continues to fall and enters, for example, zone D, E, or F of the embodiment of the visualization illustrated in FIG. 1, the electronic device 530, or the processor 430 of the Power Quality meter 400, may cause a second action to be taken. This second action may be one which is configured to help alleviate the Power Quality issue. For example, responsive to the Power Quality Rating falling into an unacceptable range, the electronic device 530, or the processor 430 of the Power Quality meter 400, may automatically initiate measures to help alleviate the Power Quality issue. These measures may include, for example, switching from utility power to backup power for one or more of the various pieces of equipment 510, removing power to one or more of the various pieces of equipment 510, causing one or more of the various pieces of equipment 510 to transition from an idle to an active state or vice versa, adjusting one or more operating parameters of a cooling system for the facility, etc.

The Power Quality meter 400 and/or the electronic device 530 of the control system 500 are in some embodiments configured and arranged to perform a method. The method includes monitoring a parameter of power, for example, Power Quality delivered to and/or supplied by an item of electrical equipment, receiving an indication of the monitored parameter and determining a rating from at least the indication of the monitored parameter using a processor of the Power Quality meter 400 and/or the electronic device 530, and displaying the rating in a graphical user interface (GUI) in a visualization including an object divided into a plurality of graphical category sub-sections. Each of the plurality of graphical categories represents a range of ratings. At least one of the plurality of graphical categories represents a greater range of ratings than at least one other of the plurality of graphical categories. In some embodiments, the method further includes automatically initiating, by the processor, measures to help alleviate an issue with the parameter of power of the item of electrical equipment, for example, a Power Quality issue, responsive to a rating of the parameter of power of the item of electrical equipment, for example, a Power Quality Rating, falling into an unacceptable range. In some embodiments, the method includes monitoring, determining a rating of, and/or displaying the rating of a parameter of the item of electrical equipment or of a facility other than a parameter of power. The parameter may be, for example, a parameter of air quality or an environmental parameter. In some embodiments the method further includes automatically initiating, by the processor, measures to help alleviate an issue with the parameter of the item of electrical equipment or of the facility other than the parameter of power.

Computer System

Various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers, and web servers. Other examples of computer systems may include mobile computing devices (e.g., smart phones, tablet computers, digital recording devices, and personal digital assistants) and network equipment (e.g., load balancers, routers, and switches). Examples of particular models include iPhones, iPads, and iPod touches running iOS operating system available from Apple, Android devices like Samsung Galaxy Series, LG Nexus, and Motorola Droid X, Blackberry devices available from Blackberry Limited, and Windows Phone devices. Further, aspects may be located on a single computer system or may be distributed among a plurality of computer systems connected to one or more communications networks.

For example, various aspects, functions, and processes may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Figure 10:
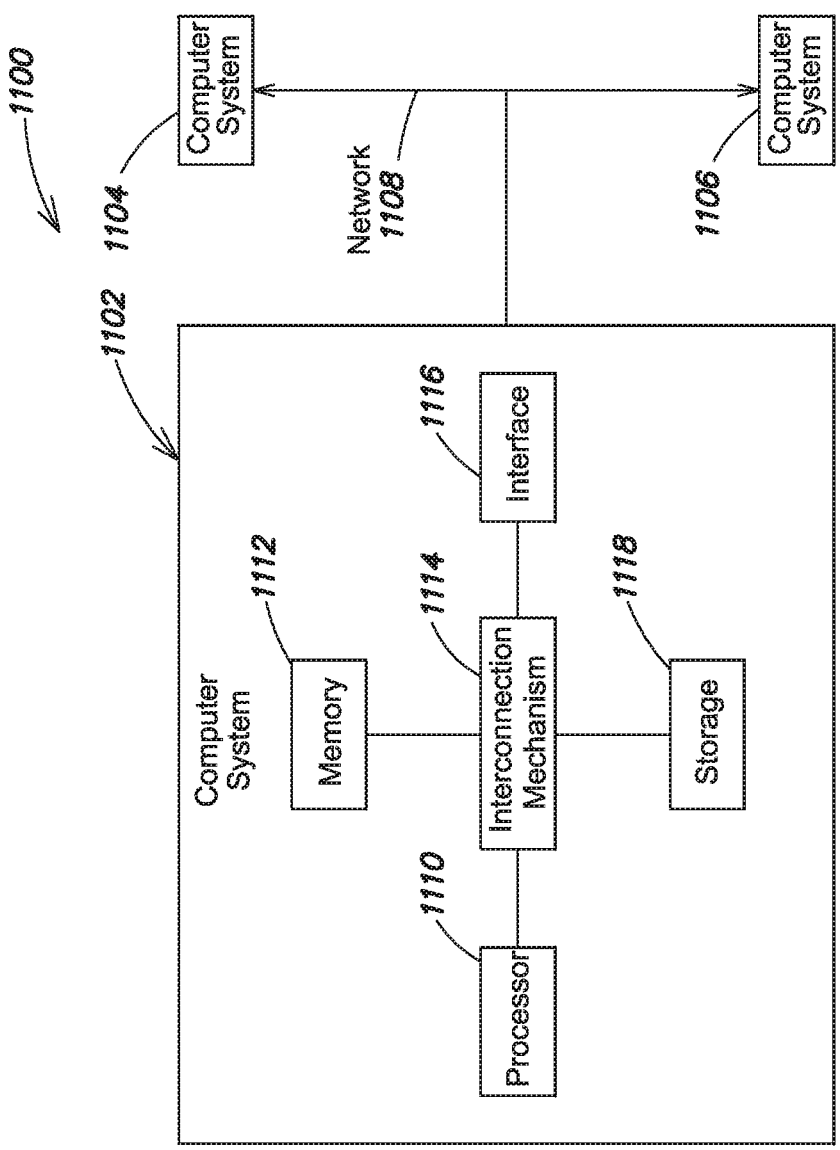
FIG. 10 schematically illustrates an example of a computer system on which aspects disclosed herein may be performed.

Referring to FIG. 10, there is illustrated a block diagram of a distributed computer system 1100, in which various aspects and functions are practiced. As shown, the distributed computer system 1100 includes one or more computer systems that exchange information. More specifically, the distributed computer system 1100 includes computer systems 1102, 1104, and 1106. As shown, the computer systems 1102, 1104, and 1106 are interconnected by, and may exchange data through, a communication network 1108. The network 1108 may include any communication network through which computer systems may exchange data. To exchange data using the network 1108, the computer systems 1102, 1104, and 1106 and the network 1108 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 1102, 1104, and 1106 may transmit data via the network 1108 using a variety of security measures including, for example, SSL or VPN technologies. While the distributed computer system 1100 illustrates three networked computer systems, the distributed computer system 1100 is not so limited and may include any number of computer systems and computing devices, networked using any medium and communication protocol.

As illustrated in FIG. 10, the computer system 1102 includes a processor 1110, a memory 1112, an interconnection element 1114, an interface 1116, and data storage element 1118. To implement at least some of the aspects, functions, and processes disclosed herein, the processor 1110 performs a series of instructions that result in manipulated data. The processor 1110 may be any type of processor, multiprocessor or controller. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor 1110 is connected to other system components, including one or more memory devices 1112, by the interconnection element 1114.

The memory 1112 stores programs (e.g., sequences of instructions coded to be executable by the processor 1110) and data during operation of the computer system 1102. Thus, the memory 1112 may be a relatively high performance, volatile, random access memory such as a dynamic random access memory ("DRAM") or static memory ("SRAM"). However, the memory 1112 may include any device for storing data, such as a disk drive or other nonvolatile storage device. Various examples may organize the memory 1112 into particularized and, in some cases, unique structures to perform the functions disclosed herein. These data structures may be sized and organized to store values for particular data and types of data.

Components of the computer system 1102 are coupled by an interconnection element such as the interconnection element 1114. The interconnection element 1114 may include any communication coupling between system components such as one or more physical busses in conformance with specialized or standard computing bus technologies such as IDE, SCSI, PCI and InfiniB and. The interconnection element 1114 enables communications, including instructions and data, to be exchanged between system components of the computer system 1102.

The computer system 1102 also includes one or more interface devices 1116 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, image projectors, speakers, network interface cards, digital image sensors, chemical sensors, hard radiation sensors, eye tracking cameras, etc. Interface devices allow the computer system 1102 to exchange information and to communicate with external entities, such as users and other systems.

The data storage element 1118 includes a computer readable and writeable nonvolatile, or non-transitory, data storage medium in which instructions are stored that define a program or other object that is executed by the processor 1110. The data storage element 1118 also may include information that is recorded, on or in, the medium, and that is processed by the processor 1110 during execution of the program. More specifically, the information may be stored in one or more data structures specifically configured to conserve storage space or increase data exchange performance. The instructions may be persistently stored as encoded signals, and the instructions may cause the processor 1110 to perform any of the functions described herein. The medium may, for example, be optical disk, magnetic disk or flash memory, among others. In operation, the processor 1110 or some other controller causes data to be read from the nonvolatile recording medium into another memory, such as the memory 1112, that allows for faster access to the information by the processor 1110 than does the storage medium included in the data storage element 1118. The memory may be located in the data storage element 1118 or in the memory 1112, however, the processor 1110 manipulates the data within the memory, and then copies the data to the storage medium associated with the data storage element 1118 after processing is completed. A variety of components may manage data movement between the storage medium and other memory elements and examples are not limited to particular data management components. Further, examples are not limited to a particular memory system or data storage system.

Although the computer system 1102 is shown by way of example as one type of computer system upon which various aspects and functions may be practiced, aspects and functions are not limited to being implemented on the computer system 1102 as shown in FIG. 10. Various aspects and functions may be practiced on one or more computers having a different architectures or components than that shown in FIG. 14. For instance, the computer system 1102 may include specially programmed, special-purpose hardware, such as an application-specific integrated circuit ("ASIC") tailored to perform a particular operation disclosed herein. While another example may perform the same operation using a grid of several general-purpose computing devices running MAC OS System X with Intel processors and several specialized computing devices running proprietary hardware and operating systems.

The computer system 1102 may be a computer system including an operating system that manages at least a portion of the hardware elements included in the computer system 1102. In some examples, a processor or controller, such as the processor 1110, executes an operating system. Examples of a particular operating system that may be executed include a Windows-based operating system, such as, Windows NT, Windows 2000 (Windows ME), Windows XP, Windows Vista, Windows Phone, or Windows 7 operating systems, available from the Microsoft Corporation, Android operating system available from Google, Blackberry operating system available from Blackberry Limited, a MAC OS System X operating system or an iOS operating system available from Apple, one of many Linux-based operating system distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 1110 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, Ruby, Objective-C, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Information may flow between any of the elements, components and subsystems disclosed herein, using a variety of techniques. Such techniques include, for example, passing the information over a network using standard protocols, such as TCP/IP, HTTP, or HTTPS, passing the information between modules in memory and passing the information by writing to a file, database, data store, or some other nonvolatile data storage device, among others. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Having thus described several aspects of at least one embodiment of this invention, it is to be appreciated various alterations, modifications, and improvements will readily occur to those skilled in the art. For example, although illustrated as a rectangle in FIG. 1, the different categories A-F could be represented as slices of a circular visualization or in any other desired shape. Although discussed herein with respect to the measurement of Power Quality, the disclosed visualizations and systems may additionally or alternatively be utilized to display different forms of information, for example, a health index for software reliability or performance data for any form of consumer or industrial equipment or of data from other sources, for example, data regarding air quality, where the number of particulates in certain size categories can be classified into different air quality tiers. Such alterations, modifications, and improvements are intended to be part of this disclosure, and are intended to be within the spirit and scope of the invention. Accordingly, the foregoing description and drawings are by way of example only.

What is claimed is:

1. A Power Quality Meter comprising:
   one or more measurement systems capable of monitoring or measuring an aspect of Power Quality at a facility and/or of one or more items of electrical or electronic equipment at the facility;
   a processor coupled to the one or more measurement systems and configured to: receive an indication of the monitored or measured aspect of Power Quality from the one or more measurement systems, and determine a Power Quality Rating or Power Quality Ratings for the facility and/or the one or more items of electrical equipment from at least the indication of the monitored or measured aspect of Power Quality; and
   a graphical user interface (GUI) coupled to the processor and configured to display the Power Quality Rating or the Power Quality Ratings in a visualization including an object divided into a plurality of graphical category sub-sections, each of the plurality of graphical category sub-sections representing a range of Power Quality Ratings, at least one of the plurality of graphical category sub-sections representing a greater range of Power Quality Ratings than at least one other of the plurality of graphical category sub-sections, wherein the processor is configured to automatically cause one or more actions to be taken in response to the Power Quality Rating or Power Quality Ratings for the facility and/or the one or more items of electrical equipment falling into a range outside of a desired range, and wherein data associated with the Power Quality Rating or the Power Quality Ratings is positioned on the visualization based on a non-linear and/or non-logarithmic transfer function defining how the data is positioned on the visualization.

2. The Power Quality Meter of claim 1, wherein the GUI is configured to display each of the graphical category sub-sections with a substantially similar size.

3. The Power Quality Meter of claim 1, wherein the GUI further includes an indication of a target range of Power Quality Ratings.

4. The Power Quality Meter of claim 1, wherein the GUI is configured to graphically indicate the graphical category sub-section representing the range of Power Quality Ratings including the Power Quality Rating or the Power Quality Ratings in an enhanced manner relative to the at least one other of the plurality of graphical category sub-sections.

5. The Power Quality Meter of claim 1, wherein the GUI is configured to display factors contributing to the Power Quality Rating or the Power Quality Ratings.

6. The Power Quality Meter of claim 1, wherein the GUI is further configured to display a warning responsive to the Power Quality Rating or Power Quality Ratings being outside of a desired range.

7. A method comprising:
   monitoring an aspect of Power Quality at a facility and/or of one or more items of electrical or electronic equipment at the facility using one or more measurement systems of a Power Quality Meter;
   receiving an indication of the monitored aspect of Power Quality and determining a rating from at least the indication of the monitored aspect of Power Quality from the one or more measurement systems, and determining a Power Quality Rating or Power Quality Ratings for the facility and/or the one or more items of electrical equipment from at least the indication of the monitored aspect of Power Quality using a processor of the Power Quality Meter;
   displaying the Power Quality Rating or Power Quality Ratings in a visualization on a graphical user interface (GUI) of the Power Quality Meter, the visualization including an object divided into a plurality of graphical category sub-sections, each of the plurality of graphical category sub-sections representing a range of Power Quality Ratings, at least one of the plurality of graphical category sub-sections representing a greater range of Power Quality Ratings than at least one other of the plurality of graphical category sub-sections, wherein data associated with the Power Quality Rating or the Power Quality Ratings is positioned on the visualization based on a non-linear and/or non-logarithmic transfer function defining how the data is positioned on the visualization; and automatically causing, by the processor, one or more actions in response to the Power Quality Rating or Power Quality Ratings for the facility and/or the one or more items of electrical equipment falling into a range outside of a desired range.

8. The method of claim 7, further comprising displaying each of the plurality of graphical category sub-sections with a substantially similar size.

9. The Power Quality Meter of claim 1, wherein the GUI indicates whether the facility is operating in a range of Power Factor that will not incur a penalty from an associated utility, or alternatively if the facility is operating in a range of Power Factor that will incur a penalty.

10. The Power Quality Meter of claim 1, wherein the GUI provides information regarding the Power Quality Rating performance of the facility as compared with other similar types of facilities.

11. The method of claim 7, wherein the GUI indicates whether the facility is operating in a range of Power Factor that will not incur a penalty from an associated utility, or alternatively if the facility is operating in a range of Power Factor that will incur a penalty.

12. The method of claim 7, wherein the GUI provides information regarding the Power Quality Rating performance of the facility as compared with other similar types of facilities.

13. The method of claim 7, wherein the actions include switching from utility power to backup power, removing power from the one or more items of electrical equipment, causing the one or more items of electrical equipment to transition from an idle state to an active state or vice versa, or adjusting one or more operating parameters of a cooling system.

14. The Power Quality Meter of claim 1, wherein the actions affect the one or more items of electrical equipment falling into the range outside of the desired range.

15. The Power Quality Meter of claim 1, wherein the actions include at least a first action, the first action including a visual and/or audio warning or some other form of warning message, textual or otherwise, to an operator of a centralized monitoring and control system associated with the Power Quality Meter.

16. The Power Quality Meter of claim 15, wherein the visual and/or audio warning or other form of warning message indicates a Power Quality issue or Power Quality issues associated with the facility and/or one or more the items of electrical equipment.

17. The Power Quality Meter of claim 16, wherein the Power Quality issue or Power Quality issues are determined based, at least in part, on the Power Quality Rating or Power Quality Ratings of the facility and/or the one or more items of electrical equipment.

18. The Power Quality Meter of claim 15, wherein the actions further include at least a second action in response to a Power Quality issue or Power Quality issues associated with the facility and/or the one or more items of electrical equipment not being resolved and the Power Quality Rating or Power Quality Ratings of the facility and/or the one or more items of electrical equipment continuing to fall.

19. The Power Quality Meter of claim 18, wherein the second action is one which is configured to help alleviate the Power Quality issue or the Power Quality issues.

20. The Power Quality Meter of claim 1, wherein the Power Quality Meter is a portable device.

21. The Power Quality Meter of claim 1, wherein the Power Quality Meter is configured to store data regarding the monitored or measured aspect of Power Quality in a memory device of the Power Quality Meter.

22. The Power Quality Meter of claim 18, wherein the second action includes switching from utility power to backup power, removing power from the one or more items of electrical equipment, causing the one or more items of electrical equipment to transition from an idle state to an active state or vice versa, or adjusting one or more operating parameters of a cooling system.

* * * * *